US005603395A

United States Patent [19]
Mabee

[11] Patent Number: 5,603,395
[45] Date of Patent: *Feb. 18, 1997

[54] ELECTRICALLY ACTUATED DISC STACK HAVING LOW RESPONSE TIME DUE TO REDUCED RESIDUAL MAGNETISM FOR USE IN DRIVES, BRAKES AND COMBINATIONS THEREOF

[75] Inventor: Brian D. Mabee, Shelby Township, Mich.

[73] Assignee: Easom Engineering & Mfg. Corp., Clinton Township, Mich.

[ * ] Notice: The term of this patent shall not extend beyond the expiration date of Pat. No. 5,172,798.

[21] Appl. No.: 499,301

[22] Filed: Jul. 7, 1995

Related U.S. Application Data

[63] Continuation-in-part of Ser. No. 340,220, Nov. 16, 1994, Pat. No. 5,533,425, which is a continuation-in-part of Ser. No. 993,307, Dec. 18, 1992, Pat. No. 5,389,049, which is a continuation-in-part of Ser. No. 846,546, Mar. 5, 1992, Pat. No. 5,242,039.

[51] Int. Cl.⁶ ..................................................... F16D 65/34
[52] U.S. Cl. .................. 192/70.13; 192/90; 188/71.5; 188/171
[58] Field of Search .............................. 192/18 B, 70.13, 192/70.19, 70.26, 84 R, 84 C, 90, 110 R, 111 B; 188/71.5, 71.7, 161, 164, 171, 196

[56] References Cited

U.S. PATENT DOCUMENTS

| | | | |
|---|---|---|---|
| 987,954 | 3/1911 | Brush | 192/70.2 |
| 2,464,129 | 3/1949 | Goettisheim . | |
| 2,547,137 | 4/1951 | Ochtman . | |
| 2,658,593 | 11/1953 | Doebeli . | |
| 2,728,878 | 12/1955 | Sperr, Jr. | 192/18 B X |
| 2,840,205 | 6/1958 | Linke . | |
| 2,958,406 | 11/1960 | Pierce | 192/84 C X |
| 3,016,118 | 1/1962 | Zatsky | 192/18 B |
| 3,251,441 | 5/1966 | Winter . | |
| 3,270,265 | 8/1966 | McNulty | 477/23 X |
| 3,324,982 | 6/1967 | Mason et al. | 192/84 C |
| 3,329,247 | 7/1967 | Jaeschke | 192/18 B X |
| 3,412,834 | 11/1968 | Root | 192/70.19 X |
| 4,079,820 | 3/1978 | Matli . | |
| 4,125,178 | 11/1978 | Monks | 192/18 A |
| 4,181,201 | 1/1980 | McCarthy | 188/171 |
| 4,279,330 | 7/1981 | Pottorff et al. . | |

(List continued on next page.)

FOREIGN PATENT DOCUMENTS 173553 12/1960 Sweden ............................. 188/171

OTHER PUBLICATIONS

Oil Shear Electric Brake Brochure of Force Control Ind, Inc, p. 3 Dated Before Jan. 1, 1992.

Spiral Retaining Rings Catalog of Smalley Steel Ring Co. pp. 34–35 Dated Before Jan. 1, 1992.

Service Manual of Two–Speed Drive II of Force Control Ind, Inc. p. 1–4, Dated Apr. 1991.

Warner"Clutches, Brakes and Controls Master Catalog", Dated Before Jan. 1, 1992, of Warner Electric Division of Dana Corp.

*Primary Examiner*—Richard M. Lorence
*Attorney, Agent, or Firm*—Peter D. Keefe

[57] ABSTRACT

An integral motor-brake incorporating an electrically actuated disc stack having minimized residual magnetism. A plurality of alignment pins are provided having abutments at each end therefor for trapping therebetween the discs of the disc stacks. Residual magnetism is minimized by the following features being provided, singly or in combination: 1) A non-magnetic material is located between an armature plate and an electromagnetic coil assembly, wherein the non-magnetic material serves as a spacer to add reluctance to the magnetic circuit and may be for example a wafer for instance composed of aluminum or stainless steel or may be a coating; and 2) A driver circuit for energizing the primary and secondary electromagnetic coils, wherein the self-induced EMF produced when current is shut-off is rapidly dissipated.

10 Claims, 7 Drawing Sheets

U.S. PATENT DOCUMENTS

| | | | |
|---|---|---|---|
| 4,352,415 | 10/1982 | Powell | 188/156 |
| 4,458,794 | 7/1984 | Yater | 192/18 A |
| 4,463,841 | 8/1984 | Kelley | 192/18 A |
| 4,577,738 | 3/1986 | Yater | 192/18 A |
| 4,607,730 | 8/1986 | Paisley . | |
| 4,607,736 | 8/1986 | Kelley | 192/18 A |
| 4,667,784 | 5/1987 | Cronin . | |
| 4,676,356 | 6/1987 | Beccaris et al. | 192/70.28 |
| 4,739,865 | 4/1988 | Yater et al. | 192/18 A |
| 4,765,448 | 8/1988 | Sommer | 192/18 A |
| 4,821,847 | 4/1989 | Langdon et al. | 188/171 |
| 4,921,078 | 5/1990 | Sommer | 188/171 |
| 4,938,321 | 7/1990 | Kelley et al. | 188/171 |
| 5,172,798 | 12/1992 | Mabee . | |
| 5,186,284 | 2/1993 | Lamela et al. . | |
| 5,242,039 | 9/1993 | Mabee . | |
| 5,389,049 | 2/1995 | Mabee . | |

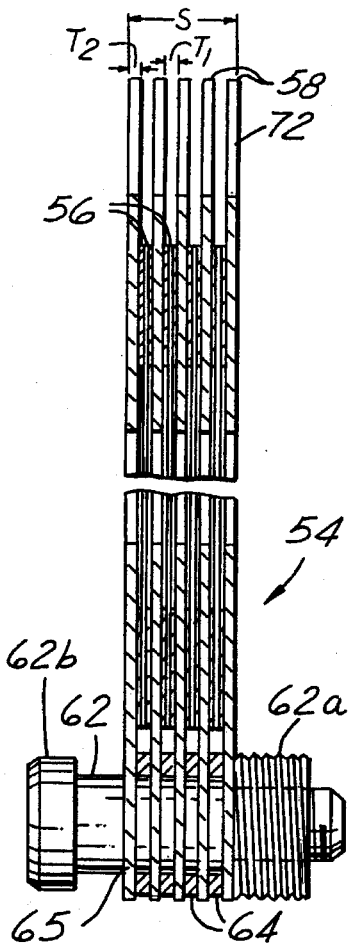
FIG.6
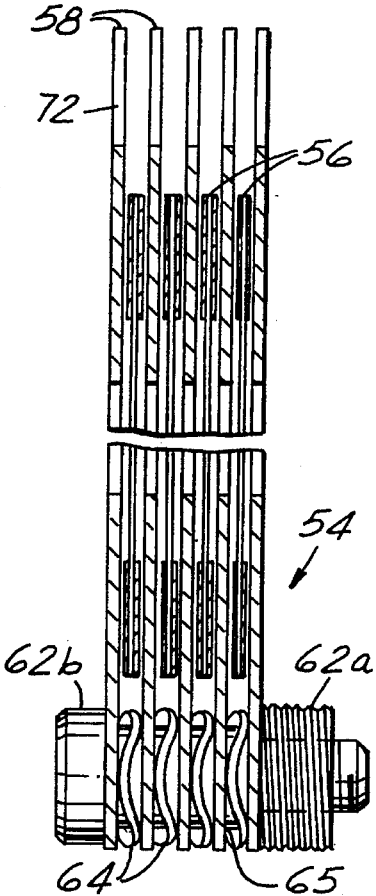
FIG.7
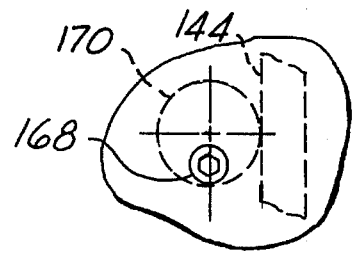
FIG.8
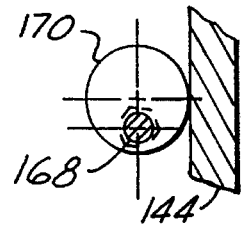
FIG.9
| FUNCTION | SECONDARY COIL | PRIMARY COIL |
|---|---|---|
| STOP | OFF | OFF |
| HIGH SPEED | OFF | ON |
| LOW SPEED | ON | OFF |
FIG.10

ELECTRICALLY ACTUATED DISC STACK HAVING LOW RESPONSE TIME DUE TO REDUCED RESIDUAL MAGNETISM FOR USE IN DRIVES, BRAKES AND COMBINATIONS THEREOF

CROSS-REFERENCE TO RELATED APPLICATIONS

The present Application is a Continuation-in-Part Application of Application Ser. No. 08/340,220, filed on Nov. 16, 1994, which issued as U.S. Pat. No. 5,533,425 on Jul. 9, 1996, said Application Ser. No. 08/340,220 being a Continuation-in-Part Application of Application Ser. No 07/993,307, filed on Dec. 18, 1992, which issued as U.S. Pat. No. 5,389,049 on Feb. 14, 1955, said Application Ser. No. 07/993,307 being a Continuation-in-Part Application of Ser. No. 07/846,546, filed on Mar. 5, 1992, which issued as U.S. Pat. No. 5,242,039 on Sep. 7, 1993.

BACKGROUND OF THE INVENTION

1. Field of the Invention

The present invention relates to disc stacks used in drives, brakes and combinations thereof utilized in connection with the movement of tooling and other loads which are normally present in manufacturing environments, such as two-speed drives incorporating brake and clutch mechanisms which selectively interface with high and low speed electric motors. More particularly, the present invention relates to oil shear disc stacks having magnetically actuated clutching and/or braking functions in a drive, brake or combination thereof. Still more particularly, the present invention relates to oil shear disc stacks of the aforesaid class having improved performance due to fast response time as a result of minimization of residual magnetism when electrical current to the solenoid thereof is shut-off.

2. Description of the Prior Art

Movement of tools and other machinery in manufacturing environments is facilitated by drives which permit both rapid movement and slow movement, coupled with a brake function. Such drives permit rapid job cycling with accurate load positioning, while providing a maximum expected operational life of the drive. Typically, such drives interface with position locating apparatus which convert rotation into translation, such as by a ballscrew apparatus. Drives of this type incorporate two electric motors: a primary drive motor used for rapid movement and a secondary drive motor coupled through a gear reduction unit used for slow movement. These drives further incorporate a brake for precisely stopping movement and a clutch for selectively engaging the primary and secondary drive motors. The clutch is structured in the form of interleaved annular discs of two annular disc sets which collectively form a stack, in which one set of annular discs is attached to a shaft connected with the secondary drive motor, while the other set of annular discs is attached to a shaft connected with the primary drive motor, and a mechanism is used to selectively control clamping pressure between adjacent annular discs. The brake is structured analogously to the clutch, except that one annular disc set is attached to a stationary housing component.

The disc stacks utilized in the brake and clutch rely upon transmission of torque from one set of annular discs to the other set of annular discs. Some systems rely upon dry frictional engagement between adjacent annular discs to provide torque transfer, this is ordinarily considered unacceptable because of excessive wear and tendency for the dry friction material coating the annular discs to inconsistently rub relative to each other, resulting in a "stick-slip" jerking action which makes accurate positioning almost impossible to achieve. Systems which rely on dry frictional engagement between the annular disc sets generally are those which utilize low clamping force actuation systems, such as those which are electromagnetically operated. Accordingly, most conventional systems rely upon disc stacks utilizing an oil shear principle, in which adjacent annular discs brought into proximity by a clamping actuator, such as a pneumatic device, mutually transmit torque by a thin film of oil therebetween due to viscous shear of the oil film. The oil serves to reduce annular disc wear, provides consistent force transmission and conducts away waste heat. Accordingly, oil shear operated disc stacks have become industry standard, although there is involved a high degree of cost and installation complexity.

An example of a conventional two-speed drive is described in U.S. Pat. No. 4,463,841 to Kelley, dated Aug. 7, 1984. In this drive, a secondary electric motor drives through a gear reducer to an input shaft which connects with a clutch. The clutch is composed of an oil shear operated disc stack, in which one annular disc set is connected with the input shaft and the other annular disc set, interleaved with the first annular disc set, is connected with an output shaft. The output shaft connects with a primary electric motor, which, in turn, provides an output shaft for the drive. The output shaft interfaces with a brake composed of a second oil shear operated disc stack, in which one annular disc set is connected with the output shaft and the other annular disc set, interleaved with the first, is connected with the housing. A pneumatically operated bi-directional piston is axially moved to selectively apply annular disc clamping pressure to either the clutch disc stack or the brake disc stack. In the former mode, the secondary electric motor is able to drive the output shaft, while in the latter mode, rotation of the output shaft is braked. In the neutral position of the bi-directional piston, the brake is off, the secondary electric motor unconnected, and the primary electric motor is used as the prime mover. Selective movement of the bi-directional piston in concert with selective actuation of the electric motors enables an operator to achieve rapid and precise relocation of a load.

While the drive described in U.S. Pat. No. 4,463,841 operates acceptably in many situations, it has several significant problems which have been only partly addressed in the prior art.

One problem is that in the event of a power or fluid pressure failure, it is possible for the drive to continue spinning without the benefit of a brake. This problem was at least partly solved by a drive described in U.S. Pat. No. 4,607,736 to Kelley, dated Aug. 26, 1986, in which the brake stack is normally clamped by biasing action of springs on the bi-directional piston, and which biasing action is overcome as long as fluid pressure is maintained in the pneumatic lines. This solution pertains, accordingly, only to pressurized fluid operated brake systems.

Another problem is that an external supply of pressurized fluid must be provided to actuate the bi-directional piston. This problem was solved by a drive described in U.S. Pat. No. 4,739,865 to Yater et al, dated Apr. 26, 1988, which discloses a drive incorporating clutch and brake components as generally described above and further incorporating a self-contained hydraulic pump system for actuating the hi-directional piston that controls clamping of the disc stacks. Accordingly, this drive eliminates the need for an external pressurized fluid source. However, this drive has the added costs of an internally provided pressurized fluid source, and it is not suited for use in two speed drives as it requires a motor to be running at the input shaft in order to actuate the bi-directional piston.

It is clear that electromagnetic actuation systems for oil shear disc stacks have superior performance characteristics, less installation cost and less maintenance cost over air actuated systems. However, a disc stack operating via an electromagnetic actuation system is far more sensitive to the need for being built according to a preset tolerance in order for the armature of the electromagnetic actuation system to properly regulate clamping of the disc stack. The standard technique used in the art for providing what is an analogous equivalent of a disc stack having a predetermined cross-section within a preset tolerance is to assemble the annular discs of the disc stack, then utilize shims to offset the effect of annular disc thickness variations, the accumulation of which exceeds, above or below, the preset tolerance of the disc stack cross-section necessary for the magnetic actuation system to function as originally designed. This situation is vastly exacerbated when the oil shear disc stack requires field servicing due to failure or wear. A technician who replaces components of the stack is working on best guess estimates as to the disc stack cross-section after re-assembly. In all likelihood, the reconditioned disc stack will fail because it is operating outside the preset tolerance of cross-section for optimum operational performance and life.

A pre-packaged disc stack, particularly of the oil shear variety, having factory determined preset tolerance of cross-section which is easily installed as a unit at the factory into a drive, brake or a combination thereof, or, in the field, is easily removed as a unit from the drive, brake or combination thereof followed by a new pre-packaged disc stack of the class aforesaid being installed as a unit is described in the aforementioned U.S. Pat. No. 5,389,049.

A problem that has been observed in oil shear disc stack units of the class described hereinabove is that residual magnetism of components of the drive, brake or the like continues for a significant amount of time, typically on the order of three to five seconds, after electrical current to the solenoid has been switched off. This residual magnetism causes the armature component to remain closed with respect to the electromagnet until the residual magnetism has decayed sufficiently for the springs to effect release of the armature. Consequently, the disc stack will remain clamped for a significant duration of time after the electrical current to the solenoid has been switched off.

While residual magnetism is present in all electrically actuated devices, this problem is more noticeable with respect to oil shear disc stacks because of the high electrical current requirements needed to clamp the discs of the disc stack and the precise positioning that is respected. By way of comparison, dry friction disc stacks require less electrical current (as the friction between discs is much higher than that between discs of an oil shear disc stack), and accordingly the effects of residual magnetism are less noticeable.

Accordingly, what remains needed is provision for minimization of the effects of residual magnetism for oil shear disc stacks in drives, brakes, and combinational applications thereof.

SUMMARY OF THE INVENTION

The present invention is an electrically actuated disc stack for drives, brakes and combinations thereof having minimized residual magnetism.

By way of one preferred example, a two-speed drive according to the present invention includes a primary drive motor which is connected at one end to an external drive shaft and at an opposite end to a primary clutch shaft. The primary clutch shaft is connected with a first set of annular discs of an oil shear clutch disk stack. A secondary clutch shaft is connected with a second set of annular discs of the clutch disk stack. The clutch disc stack is biased by springs acting on a clutch armature plate to thereby result in the clutch disc stack being in a normally clamped mode, clamping being released by the clutch armature plate being actuated by magnetism of a clutch electromagnetic coil assembly. The secondary input shaft is connected through a gear reduction unit to a primary input shaft that is connected at one end to a secondary drive motor and at the other end to a first set of annular discs of an oil shear brake disk stack. A second set of annular discs of the brake disk stack is connected to a stationary housing component. The brake disc stack is biased by springs acting on a brake armature plate to thereby result in the brake disc stack being in a normally clamped mode, clamping being released by the brake armature plate being actuated by magnetism of a brake electromagnetic coil assembly.

The clutch and brake disc stacks are preferably pre-assembled and preferably held in a pre-aligned orientation by operation of a plurality of alignment pins and wave washers carried on the alignment pins. A manual over-ride may be provided adjacent the brake electromagnetic coil assembly which permits selective release of spring biasing with respect to the brake disc stack so that a manual crank may be operated.

High speed positioning is accomplished by energization of the primary drive motor as well as energization of a primary electromagnetic coil of the clutch electromagnetic coil assembly. Braking is achieved by de-energizing the primary drive motor and the primary electromagnetic coil. Low speed positioning is accomplished by energization of the secondary drive motor (while the primary drive motor and primary electromagnetic coil are de-energized) and energization of a secondary electromagnetic coil of the brake electromagnetic coil assembly. Braking is achieved by de-energizing the secondary drive motor and the secondary electromagnetic coil.

By way of another preferred example, an integral motor-brake is provided, wherein an electric motor is directly connected with a brake assembly. The motor shaft is connected to a brake hub that connects with a first set of annular discs of an oil shear brake disk stack. A second set of annular discs of the brake disk stack is connected to a stationary housing component. The brake disc stack is biased by springs acting on a brake armature plate to thereby result in the brake disc stack being in a normally clamped mode, clamping being released by the brake armature plate being actuated by magnetism of an electromagnetic coil assembly. The brake disc stack is preferably pre-assembled and preferably held in a pre-aligned orientation by operation of a plurality of alignment pins and wave washers carried on the alignment pins.

According to the present invention, residual magnetism is minimized by the following features being provided, singly or in combination, in a drive, brake or combination thereof, as for example in the preferred two-speed drive and the integral motor-brake described hereinabove, as follows.

1) A non-magnetic material is located between the clutch armature plate and the clutch electromagnetic coil assembly, and a non-magnetic material is located between the brake armature plate and the brake electromagnetic coil assembly. The non-magnetic material serves as a spacer to add reluctance to the magnetic circuit and may be for example a wafer for instance composed of aluminum or stainless steel or may be a coating.

2) A driver circuit for energizing the primary and secondary electromagnetic coils, wherein the self-induced EMF produced when current is shut-off is rapidly dissipated. Preferably, this is accomplished by a driver circuit including a varistor.

3) non-magnetic drive components are used in the immediate path of the magnetic circuit of the clutch and brake electromagnetic coil assemblies. For example, the portion of the drive shaft concentric with respect to the clutch electromagnetic coil assembly is composed of a non-magnetic metal, such as aluminum. This has the effect to reduce residual magnetism in that the drive shaft will not be contributing its own permanent magnetism acquitted during energization of the primary electromagnetic coil.

Accordingly, it is an object of the present invention to provide an electrically actuated oil shear disc stack clutch, brake or combination thereof having minimum residual magnetism and, as a consequence thereof, very fast response time.

It is another object of the present invention to provide an electrically actuated oil shear disc stack clutch, brake or combination thereof having minimum residual magnetism and, as a consequence thereof, very fast response time, wherein each disc stack thereof is biased by springs acting on an armature plate to thereby result in the disc stack being in a normally clamped mode, clamping being released by the armature plate being actuated by magnetism of a respective electromagnetic coil assembly.

It is a further object of the present invention to provide an electrically actuated oil shear disc stack clutch, brake or combination thereof having minimum residual magnetism and, as a consequence thereof, very fast response time, wherein each disc stack thereof is biased by springs acting on an armature plate to thereby result in the disc stack being in a normally clamped mode, clamping being released by the armature plate being actuated by magnetism of a respective electromagnetic coil assembly, wherein minimization of residual magnetism is provided by a non-magnetic material being located between each armature plate and its respective electromagnetic coil assembly.

It is an additional object of the present invention to provide an electrically actuated oil shear disc stack clutch, brake or combination thereof having minimum residual magnetism and, as a consequence thereof, very fast response time, wherein each disc stack thereof is biased by springs acting on an armature plate to thereby result in the disc stack being in a normally clamped mode, clamping being released by the armature plate being actuated by magnetism of a respective electromagnetic coil assembly, wherein minimization of residual magnetism is provided by a driver circuit for energizing each electromagnetic coils of the respective electromagnetic coil assemblies so that self-induced EMF produced when current is shut-off is rapidly dissipated.

It is another object of the present invention to provide an electrically actuated oil shear disc stack clutch, brake or combination thereof having minimum residual magnetism and, as a consequence thereof, very fast response time, wherein each disc stack thereof is biased by springs acting on an armature plate to thereby result in the disc stack being in a normally clamped mode, clamping being released by the armature plate being actuated by magnetism of a respective electromagnetic coil assembly, wherein minimization of residual magnetism is provided by non-magnetic drive components being used in the immediate path of the magnetic circuit of the respective electromagnetic coil assemblies.

It is yet an additional object of the present invention to provide a two-speed drive having a clutch and a brake each of which incorporating spring biased disc stacks, in which each disc stack is pre-assembled as a unit for providing easy and precise installation and wherein residual magnetism is minimized.

It is still another object of the present invention to provide an integral motor-brake incorporating spring biased disc stacks, in which each disc stack is pre-assembled as a unit for providing easy and precise installation and wherein residual magnetism is minimized.

These, and additional objects, advantages, features and benefits of the present invention will become apparent from the following specification.

BRIEF DESCRIPTION OF THE DRAWINGS

FIG. 6 is an edge view of the pre-assembled disk stack shown in FIG. 4, seen along lines 6—6 in FIG. 5, in which the pre-assembled disk stack is in a clamped mode.

FIG. 7 is an edge view of the pre-assembled disk stack shown in FIG. 6, now showing the pre-assembled disk stack in an unclamped mode.

FIG. 8 is plan view of a manual over-ride assembly for the first preferred two-speed drive, seen along lines 8—8 in FIG. 1.

FIG. 9 is a partly sectional plan view of the manual over-ride assembly, seen along lines 9—9 in FIG. 1.

FIG. 10 is a schematic diagram of electrical functions with respect to actuation of the primary and secondary drive motors and the primary and secondary electromagnetic coils of the first preferred two-speed drive.

DETAILED DESCRIPTION OF THE PREFERRED EMBODIMENT

As indicated hereinabove, the present invention is a directed to providing minimized residual magnetism so that response time is also minimized in drives, brakes and combinations thereof which utilize magnetically actuated oil shear disc stacks. In order to fully understand the principles of the structure and function of the present invention, a first preferred two-speed drive will be elaborated as an exemplary environment of operation, followed by elaboration of a second preferred two-speed drive equipped with the present invention, and finally, followed by an integral motor-brake equipped with the present invention.

Figure 1:
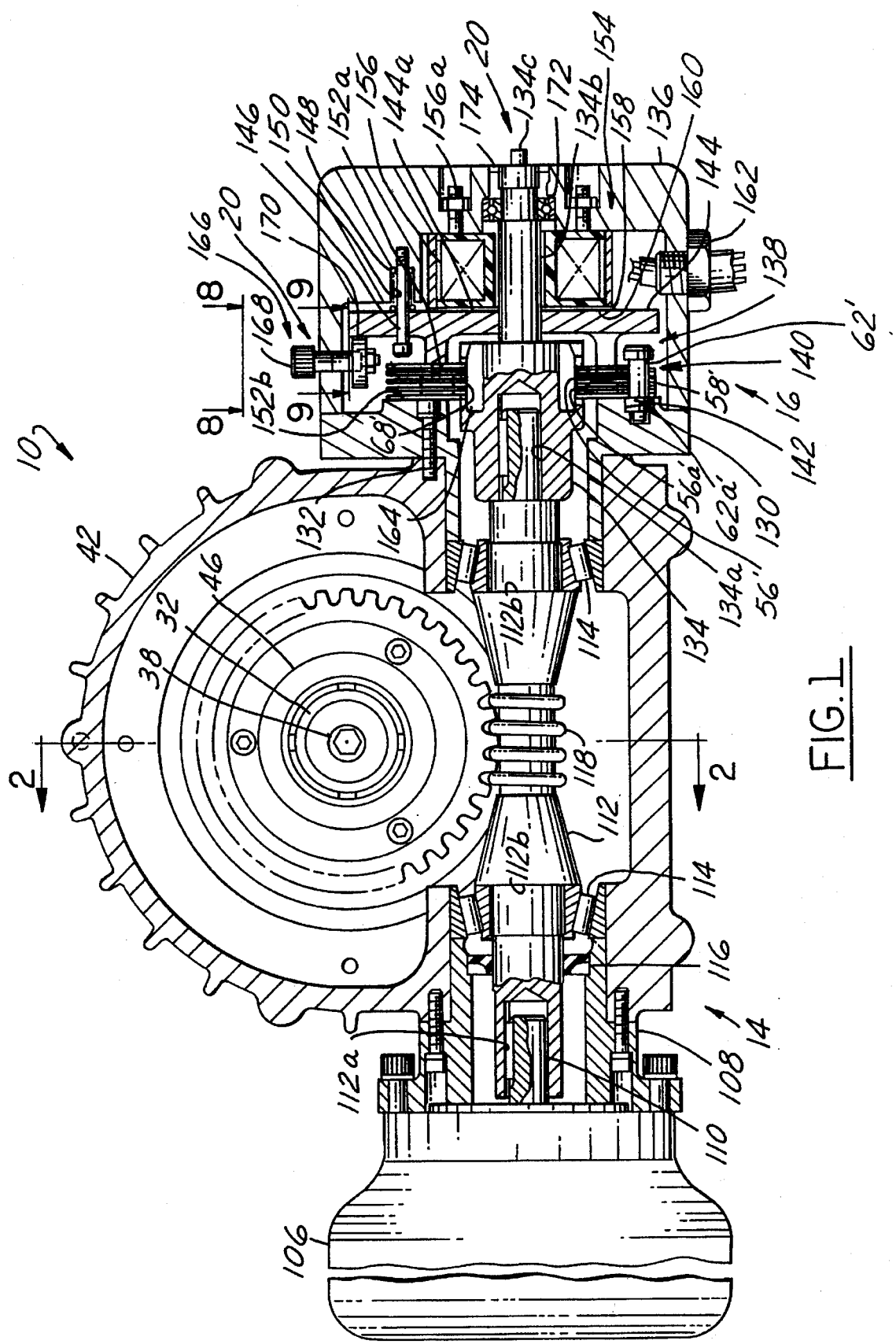
FIG. 1 is a partly sectional end view showing a pre-assembled disc stack of the brake portion of a first preferred two-speed drive, seen along lines 1—1 in FIG. 2 and depicting in particular the secondary drive assembly and the brake assembly.
Figure 2:
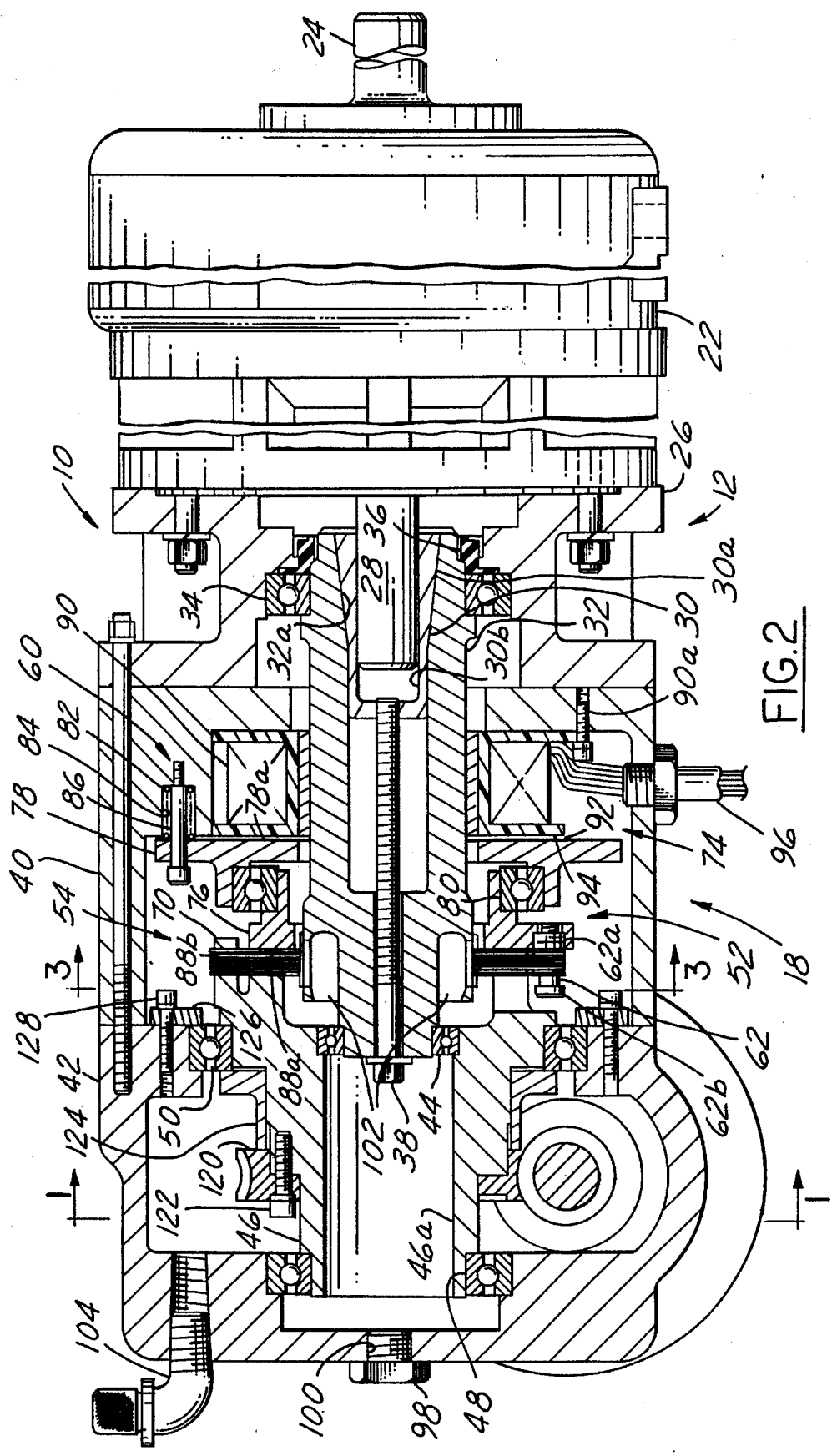
FIG. 2 is a partly sectional side view, directing a pre-assembled disc stack of the clutch portion of the first preferred two-speed drive, seen along lines 2—2 in FIG. 1 and showing in particular the primary drive assembly and the clutch assembly.

Referring now to the Drawing, a general over-view of a first preferred two-speed drive 10 can be understood with reference being had to FIGS. 1 and 2. The two-speed drive 10 is composed of a primary drive assembly 12 for providing high speed driving, a secondary drive assembly 14 for providing low speed driving, a normally engaged brake assembly 16 for providing controlled stopping, and a normally engaged clutch assembly 18 for providing selective engagement between the secondary drive assembly and the brake assembly with respect to the primary drive assembly. The primary drive assembly 12 directly provides rapid positional movement, with braking achieved by engagement of the clutch assembly 18 and the brake assembly 16. The secondary drive assembly 14 provides slow positional movement driven through the clutch assembly 18, with braking achieved by engagement of the brake assembly 16. Both the clutch assembly 18 and the brake assembly 16 operate on the oil shear principle, and are structured to be actuated selectively by energization of respective electromagnetic coils. The brake assembly 16 is connected with a manual over-ride assembly 20 for providing manual driving for purposes of set-up or in the event of a power failure.

A. The Primary Drive Assembly

The primary drive assembly 12 includes a primary drive motor 22 of a standard electric type, preferably three-phase and operating at approximately 1,725 RPM. The primary drive motor 22 has, at one side thereof, an external drive shaft 24 for interfacing with an external position movement apparatus (not shown) such as a ballscrew apparatus. The opposite side of the primary drive motor 22 is fastened to an adapter housing 26 for rigidly securing the primary drive motor with respect to the two-speed drive 10. Energization of the primary drive motor 22 provides direct high speed drive of the position movement apparatus.

B. The Clutch Assembly

The clutch assembly 18 will now be detailed. The opposite end of the primary drive motor is provided with a primary drive shaft 28. A collet 30 having a gently tapered outside surface 30a with slots cut out radially from the center to the outside surface, has an axial bore 30b into which the primary drive shaft 28 press fits. The collet 30 fits into a tapered seat 32a provided in one end of a primary clutch shaft 32. The primary clutch shaft 32 is rotatably mounted with respect to the adapter housing by a first primary clutch shaft bearing 34; adjacent thereto is an oil seal 36 therebetween. A collet bolt 38 extends through the primary clutch shaft 32 from the opposite end thereof and threadably engages with the collet 30. Tightening of the collet bolt 38 results in the collet being drawn into and compressed by the tapered seat 32a, thereby clamping it with respect to the drive shaft 28. Loosening of the collet bolt 38 permits undamaged disassembly.

The adapter housing 26 is connected with a clutch assembly housing 40, which is, in turn, connected with a secondary drive housing 42. The opposite end of the primary clutch shaft 32 is rotatably supported on a second primary clutch shaft bearing 44. The second primary clutch shaft bearing 44 engages an axial bore 46a in a secondary clutch shaft 46, and is useful to provide axial location of the primary clutch shaft 32 so as to facilitate assemblage of the clutch assembly prior to installation of the primary drive motor 22. The secondary clutch shaft 46 is rotatably connected at one end to the secondary drive housing 42 by a radial support bearing 48, and is further connected to the secondary drive housing at an intermediate location by a four point contact bearing 50 which is able to take axial thrust loads generated by clutch springs (which are discussed hereinbelow).

The primary clutch shaft 32 is selectively connected with the secondary clutch shaft 46 through a clutch 52. The clutch 52 operates on the oil shear principle, and is composed of a pre-assembled disc stack 54 having a first set of annular discs 56 which are interleaved with a second set of annular discs 58, the two sets of annular discs being unclamped by selective energization of an electromagnetic coil assembly 60. The annular discs of the pre-assembled disc stack 54 are of a composition, shape and surface finish well known in the art of oil shear torque transfer.

The pre-assembled disc stack 54 is held together as a unit by a plurality of axially projecting and circumferentially disposed alignment pins 62. In this regard, the second set of annular discs 58 is provided with a plurality of alignment holes 65 through which the alignment pins pass. The annular discs of each set 56, 58 are stacked in a pre-arranged sequence. A wave washer 64 is preferred, but not required, to be placed between each of the annular discs of the second set 58. Upon completion of this stacking process, a double threaded nut 62a is threaded onto an end of each of the alignment pins 62; it is preferred for a thread lock adhesive to be used to assure that the double threaded nuts 62a remain permanently threaded at a desired location on the alignment pins 62. Accordingly, both sets of annular discs 56, 58 are trapped between a head 62b at one end of each of the alignment pins 62 and the double threaded nut 62a at the other end of each of the alignment pins. Of course, other configurations for the alignment pins are possible, so long as they are arranged and structured to interact abutably with the annular discs in a manner that holds the pre-assembled disc stack 54 together as a unit, With added specificity for providing a pre-assembled disc stack of predetermined cross-section within a preset tolerance, a plurality of annular discs used for the first and second sets of annular discs 56, 58 are provided, each annular disc of each set having a respective predetermined thickness within a respective tolerance which pertains to that set. For example, annular discs of the first set 56 each have a first predetermined thickness $T_1$ having a tolerance of plus or minus 0.002 inch, and annular discs of the second set 58 each have a second predetermined thickness $T_2$ having a tolerance of plus or minus 0.003 inch. The annular discs of the first and second sets 56, 58 are sequentially stacked according to the prearranged order, wherein particular annular discs are selected having known thicknesses so that the cumulative total cross-section of the stacked discs (see FIG. 6) is within a preset tolerance of a predetermined cross-section S of the pre-assembled disc stack 54. That is in this example, the cumulative cross-section of the disc stack is equal to the first predetermined thickness $T_1$ plus or minus a selected thickness variation within the preset tolerance limit therefor times the number of annular discs in the first set 56, plus the second predetermined thickness $T_2$ plus or minus a selected thickness variation within the preset tolerance limit therefor times the number of annular discs in the second set 56. It is to be noted that at least one thickness and at least one preset tolerance may be applicable to the annular discs of each set of the pre-assembled disc stack 54. Next, an alignment pin 62 is placed, respectively, through each of the circumferentially disposed alignment holes 65 in the second set of annular discs 58 and secured in place, respectively, by the double threaded nuts 62, thereby assembling as a unit both sets of annular discs 56, 58 into the pre-assembled disc stack 54.

Figure 3:
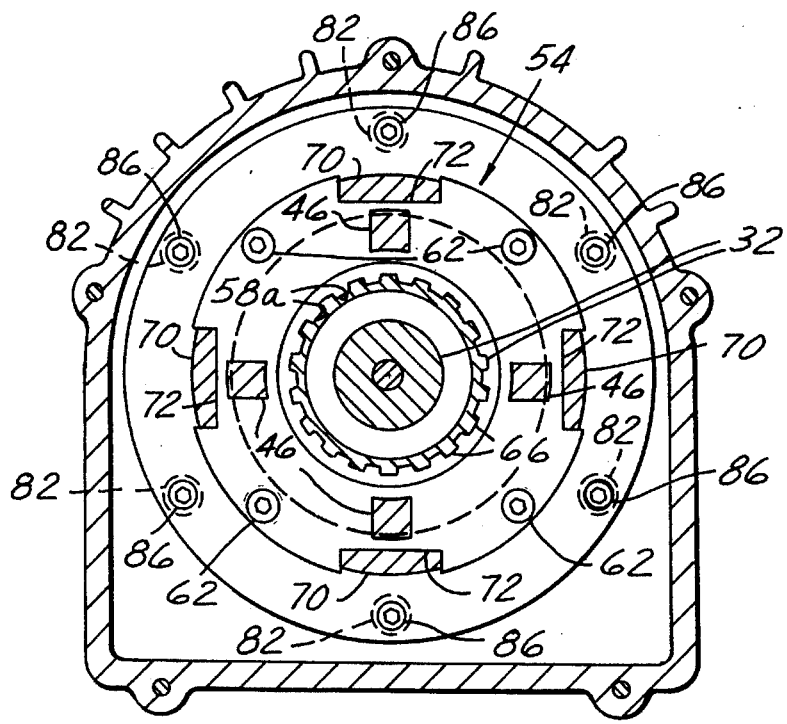
FIG. 3 is a partly sectional end view of the first preferred two-speed drive, seen along lines 3—3 in FIG. 2 and showing in particular the pre-assembled disc stack thereof.
Figure 4:
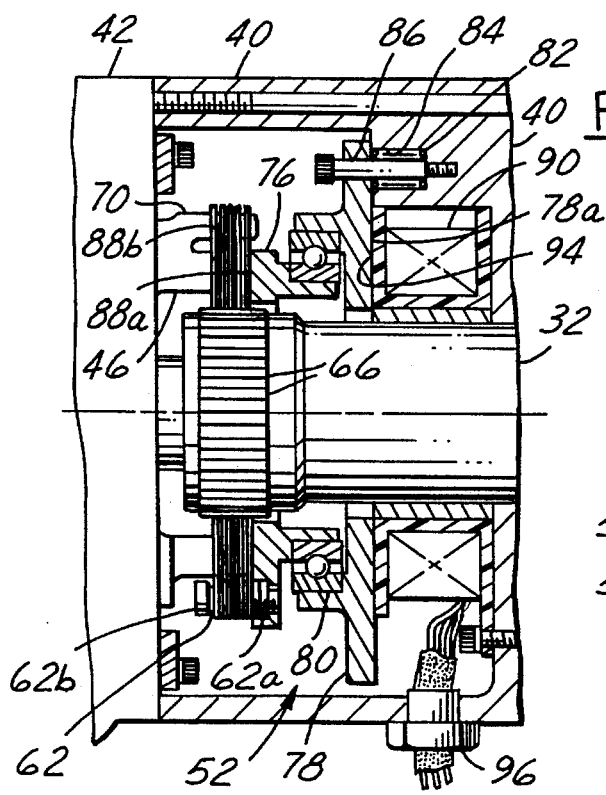
FIG. 4 is a detail partly sectional side view of the first preferred two-speed drive, showing in particular the pre-assembled disc stack from the same vantage as that of FIG. 2.
Figure 5:
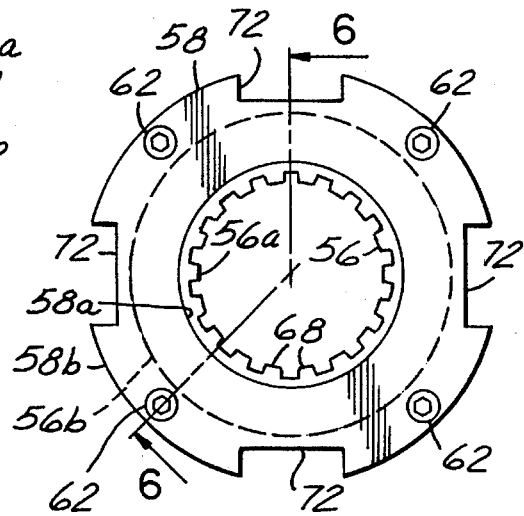
FIG. 5 is a detail plan view of an annular disc of the pre-assembled disc stack as seen from the vantage as that of FIG. 3.

The pre-assembled disc stack 54 is structured to engage the primary and secondary clutch shafts 32, 46, and the first and second sets of annular discs 56, 58 are respectively axially slidable therewith. In this regard, the primary clutch shaft 32 is provided with splines 66 which engage teeth 68 on the inner periphery 56a of the first set of annular discs 56 (the cross-section of the inner periphery 58a of the second set of annular discs 58 being greater than that of the aforesaid inner periphery 56a, as shown in FIG. 5). In this regard further, the secondary clutch shaft is provided with a plurality of axially oriented lugs 70 which are structured to engage similarly dimensioned notches 72 on the outer periphery 58b of the second set of annular discs 58 (the cross-section of the outer periphery 56b of the first set of annular discs 56 being less than that of the aforesaid outer periphery 58b, as shown also in FIG. 5). See FIGS. 3 through 7, wherein FIGS. 5, 6 and 7 show the general structure of the pre-assembled disc stack and FIGS. 3 and 4 show placement thereof with respect to the primary and secondary clutch shafts 32, 46.

As indicated above, the annular discs composing the pre-assembled disc stack 54 are selectively clamped together to thereby couple the primary clutch shaft 32 with respect to the secondary clutch shaft 46. In this regard, each of the double threaded nuts 62a threadably engage a clutch thrust plate 76. The clutch thrust plate 76, which rotates with the secondary clutch shaft 46, is connected to a non-rotating clutch armature plate 78 via a four-point contact bearing 80. A plurality of clutch springs 82 are seated within clutch spring cavities 84 located in the clutch assembly housing 40. The clutch springs 82 bias against the clutch armature plate 76, causing the clutch thrust plate 76 to bias against the pre-assembled disc stack 54. Axial movement of the clutch armature plate 76 in response to the biasing of the clutch springs 82, is regulated by shoulder bolts 86 which slidably engage the clutch armature plate and emanate anchorably from each of the clutch spring cavities 84. Clamping force between the two sets of annular discs 56, 58 is supplied by the biasing action of the clutch springs 82 evenly pressing a first thrust surface 88a on the clutch thrust plate 76 toward a second thrust surface 88b on the secondary clutch shaft 46.

Normally, the two sets of annular discs 56, 58 are clamped together by the biasing of the clutch springs 82. Accordingly, normally the secondary clutch shaft 46 is engaged with respect to the primary clutch shaft 32. In order that this engagement be user selectable, a clutch electromagnetic coil assembly 60 is provided. The clutch electromagnetic coil assembly 60 is composed of a primary electromagnetic coil 90 which is axially located within and connected by mounting bolts 90a to the clutch assembly housing 40 so that the clutch assembly housing serves as a heat sink for the primary electromagnetic coil. A working air gap 92 is provided between the pole 94 of primary electromagnetic coil 90 and a coil face portion 78a of the clutch armature plate 78, which is constructed of a magnetic material. Upon energization of the primary electromagnetic coil 90, the clutch armature plate 78 is magnetically attracted thereto and moves axially toward the pole 94, the biasing force of the clutch springs being overcome. Since the four-point contact bearing 80 and the clutch thrust plate 76 move with the clutch armature plate 78, the clamping force being applied to the pre-assembled disc stack 54 by the clutch springs 82 is relieved. Accordingly, the secondary clutch shaft 46 becomes disengaged from the primary clutch shaft 32. In this respect, the working gap 94 and the necessary amount of inter-disc distance are predetermined with respect to the preset tolerance of the predetermined cross-section of the pre-assembled disc stack 54 so that the two sets of annular discs 56, 58 are rotatively independent when the primary electromagnetic coil 90 is energized. An electric feed through 96 is provided through the clutch assembly housing 40 to provide connection of the primary electromagnetic coil 90 to a source of electricity.

Oil is filled within clutch assembly 18 via a removable threaded filler/sight cap 98 which threads into a filler hole 100 through the secondary drive housing 42, and located in axial alignment with the primary clutch shaft 32. Oil is filled through the filler hole 100 with the clutch assembly 18 in a tilted orientation. Oil level is indicated through a sight in the filler/sight cap 98. In order to ensure proper oil flow between the annular discs of the pre-assembled disc stack 54, a centrifugal oil pump 102 is provided on the primary clutch shaft 32 adjacent the splines 66. A breather 104 is provided in the secondary drive housing 42 for keeping atmospheric pressure within the clutch assembly 18; excessive pressure can lead to oil seal failure, and therefore is to be avoided. Oil is circulated around the primary electromagnetic coil 90 to assist heat dissipation. Due to the use of oil, throughout the two-speed drive 10, oil seals and gaskets between housing components are utilized to prevent oil leaks.

The pre-assembled disc stack 54 utilized in the clutch assembly 18 has a number of significant advantages.

First, pre-assembly of the disk stack by operation of the alignment pins 62 assures a proper order and selection of the annular discs and a preset tolerance of the cumulative cross-section of the disk stack. The preset tolerance is critical so that the working air gap 92 is minimized and operation is trouble free over a long operational life; disc order and disc selection is also critical to allowing the pre-assembled disc stack 54 to be held as tightly as possible per the preset tolerance of the predetermined cumulative cross-section of the disc stack. A more tightly held disc stack results in a minimization of the clutch electromagnetic coil assembly 60, since the force exerted by the primary electromagnetic coil 90 on the clutch armature plate 78 is inversely proportional to the square of the distance the clutch armature plate must travel.

Second, assemblage is simplified and made much less susceptible to error since the disk stack is a pre-assembled package. There is no possibility for annular disc order mistake or the cumulative cross-section of the disc stack exceeding tolerance. In this regard, the pre-assembled disc stack 54 is placed as a whole within the clutch 52 and then the teeth 68 of the first set of annular discs 56 are slipped on the splines 66 of the primary clutch shaft 32. Upon completion, the double threaded nuts 62a are threaded into the clutch thrust plate 76. Next, the secondary clutch shaft 46 is located with the lugs 70 engaging the notches 72 on the second set of annular discs 58; in this regard, the first clutch thrust surface 88a is useful to help alignment of the annular discs. The shoulder bolts 86 capture the clutch armature plate 78, clutch thrust plate 76, the four point contact bearing 80 and the clutch springs 82, so that these can be assembled as a sub-assembly.

Third, the alignment pins 62 permit the use of the wave washers 64 between each of the annular discs of the first set of annular discs 56. The wave washers are important to help reduce adjacent annular disc dragging caused by surface tension of the oil. Further, the wave washers help to ensure even wear across adjacent surfaces of the annular discs.

Torque transfer between the two sets of annular discs 56, 58 can be varied per particular application of the two speed drive 10 by providing clutch springs 82 having a certain preselected spring constant. Further, the pre-assembled disc stack 54 may be configured as desired, such as two or more annular discs of the same set being mutually adjacent rather than being alternately sequentially stacked throughout the disc stack.

C. The Secondary Drive Assembly

The secondary drive assembly 18 includes a secondary drive motor 106 connected to a C-face adapter 108, the C-face adapter being connected with the secondary drive housing 42. The secondary drive motor 106 is preferred to be a three phase electric motor, and may have the same ratings as the primary drive motor 22; typically, however, the secondary drive motor will have a lower horsepower rating than the primary drive motor. A secondary drive shaft 110 of the secondary drive motor 106 is keyed to engage with a keywayed bore 112a of a worm shaft 112. The worm shaft 112 is rotatably supported with respect to the secondary drive housing 42 by a pair of support bearings 114 which axially affix the worm shaft. An oil seal 116 is located between the secondary drive shaft 110 and the C-face adapter 108. The worm shaft 112, at an intermediate position between the support bearings 114, is provided with a spiral worm 118.

A worm gear 120 is connected to the secondary clutch shaft 46 at an intermediate position between the radial support bearing 48 and the four point support bearing 50 by a plurality of worm gear bolts 122 and reamed dowels. A spacer ring 124, which axially affixes the four point support bearing 50, is clamped by the worm gear 120. The worm gear 120, the spacer ring 124, the bearings 48, 50, and the secondary clutch shaft 46 are captured by a retainer ring 126 via a plurality of ring bolts 128; accordingly, these components may be assembled as a sub-assembly. The worm gear 120 gearably engages the worm 118 so that energization of the secondary drive motor 106 results in the worm driving the secondary clutch shaft 46.

D. The Brake Assembly

The brake assembly 16 includes a brake mounting plate 130 which is connected to the secondary drive housing 42 by a plurality of bolts 132. The support bearings 114 are axially trapped by respectively adjacent shoulders 112b on the worm shaft 112 in combination with the C-face adapter 108 and the brake mounting plate 130. The worm shaft 112, opposite the secondary drive motor 106, is keyed for engagement with a keywayed bore 134a of a brake hub 134. A brake housing 136 is connected with the brake mounting plate 130.

The worm shaft 112 is selectively stopped through operation of a brake 138 connected with the worm shaft 112 and the stationary housing components of the two-speed drive 10. As in the clutch 52, the brake 138 operates on the oil shear principle, and is composed of a second pre-assembled disc stack 140 having the specifications detailed hereinabove with respect to the previously detailed pre-assembled disc stack 54. Accordingly, for the sake of brevity, the same numerals with a prime are used to show like functioning components as between the pre-assembled disc stack 54 and the second pre-assembled disc stack 140. In this regard, it is important to note that the second pre-assembled disc stack 140 is also pre-assembled using a plurality of axially projecting and circumferentially disposed alignment pins 62'.

The second pre-assembled disc stack 140 is structured to engage the worm shaft 112 and the non-rotating housing components, namely the brake mounting plate 130, and the first and second sets of annular discs 56', 58' are respectively axially slidable therewith. In this regard, the brake hub 134 is provided with splines 140 which engage teeth 68' on the inner periphery 56a' of the first set of annular discs 56'. In this regard further, the brake mounting plate 130 is provided with threaded seats 142 for threadably receiving the double threaded nuts 62a' of the alignment pins 62'. In this way, the second set of annular discs 58' are held rotatively fixed with respect to the brake mounting plate 130.

The brake 138 is actuated by the annular discs composing the second pre-assembled disc stack 140 being selectively clamped together to thereby couple the worm shaft 112 to the brake mounting plate 130. In this regard, a brake armature plate 144, is slidably supported and guided by a plurality of shoulder bolts 146, analogously as in the clutch 52, which emanate anchorably from brake spring cavities 150 in the brake housing 136. A brake spring 148 is seated within each of the brake spring cavities 150. The brake springs 148 bias against the brake armature plate 144, causing it to bias against the second pre-assembled disc stack 140. Clamping force between the two sets of annular discs 56', 58' is supplied by the biasing action of the brake springs 148 evenly pressing a first brake thrust surface 152a on the brake armature plate 144 toward a second brake thrust surface 152b on the brake mounting plate 130.

Normally, the two sets of annular discs 56', 58' are clamped together by the biasing of the brake springs 148. Accordingly, normally the worm shaft 112 is engaged with respect to the stationary housing components, via the brake mounting plate 130. In order that this engagement be user selectable, a brake electromagnetic coil assembly 154 is provided. The brake electromagnetic coil assembly 154 is composed of a secondary electromagnetic coil 156 which is axially located within and connected by mounting bolts 156a to the brake housing 136 so that the brake housing serves as a heat sink for the secondary electromagnetic coil. A working air gap 158 is provided between the pole 160 of the secondary electromagnetic coil 156 and a coil face portion 144a of the brake armature plate 144, which is constructed of a magnetic material. Upon energization of the secondary electromagnetic coil 156, the brake armature plate 144 is magnetically attracted thereto and moves axially toward the pole 160, the biasing force of the brake springs 148 being overcome so that the clamping force being applied to the second pre-assembled disc stack 140 by the clutch springs 82 is relieved. Accordingly, the worm shaft 112 becomes disengaged from the brake mounting plate 130. In this respect, the working gap 158 and the necessary amount of inter-disc distance are predetermined with respect to the preset tolerance of the predetermined cross-section of the second pre-assembled disc stack 140 so that the two sets of annular discs 56', 58' are rotatively independent when the secondary electromagnetic coil 156 is energized. An electric feed through 62 is provided through the brake housing 136 to provide connection of the secondary electromagnetic coil 156 to a source of electricity. As in the primary electromagnetic coil 90, oil is permitted to circulate about the secondary electromagnetic coil 156 to assist in heat dissipation.

To ensure proper operation of the second pre-assembled disc stack 140, a centrifugal oil pump 164 is connected with the brake hub 134. As in the pre-assembled disc stack 54, the second pre-assembled disc stack 140 may be adjusted as described hereinabove to provide a desired torque transference between the two sets of annular discs 56', 58'. The brake 138 is assembled with the second pre-assembled disc stack 140 being placed therein as a unit analogously as described with respect to the clutch 52, except in particular that there is no thrust plate and there are no lugs to be interfaced with the second pre-assembled disc stack. The shoulder bolts 146 capture the brake armature plate 144 and the brake springs 148, so that these may be assembled as a sub-assembly.

E. The Manual Over-ride Assembly

The manual over-ride assembly 20 includes a manual release mechanism 166 which is connected with the brake housing 136. The manual release mechanism is composed of a socket head bolt 168 which passes through the brake housing 136 and has eccentrically mounted thereto a release plate 170 having a rounded contour. The release plate 170 is held fixed to the socket head bolt 168 by two machined flats, and an O-ring is employed to prevent oil leakage out of the brake housing 136. The rounded contour of the release plate 170 contacts the brake armature plate 144. Rotation of the socket head bolt 136 to a first position results in the release plate 170 being disengaged from biasing against the brake armature plate 144. Rotation of the socket head bolt 136 to a second position results in the release plate 170 biasing against the brake armature plate 144 so as to overcome the biasing force of the brake springs 148 and thereby releasing clamping pressure of the brake armature plate 144 on the second pre-assembled disc stack 140. Accordingly, in this second position of the socket head bolt 168, the worm gear 112 is free to turn. The second position of rotation of the socket head bolt is preferred to be prevented by a stop, such as for example a boss on the socket head bolt striking an abutment on the brake housing, from being at a location in which the eccentric axis of the release plate 170 is aligned with respect to the socket head bolt and the brake armature plate 144; that is, upon release of turning pressure on the socket head bolt, the force of the brake springs 148 will cause the socket bolt head to automaticlly rotate back to the first position, and thereby de-activate release of the brake 138.

The over-ride assembly 20 further includes a crank mechanism 172 for permitting manual operation of the two-speed drive 10. In this regard, the brake hub 134 is provided with an extension shaft 134b which has an end 134c which extends out of the brake housing 136. The extension shaft 134b is rotatably supported with respect to the brake housing 136 by bearings 172, and an oil seal 174 therebetween prevents oil leakage. A crank (not shown) is connected with the extension shaft end 134c so that a user, after releasing the brake 138 by use of the manual release mechanism 166, the worm gear 112 may be manually rotated as long as the brake remains released.

F. Operation

Operation of the two-speed drive 10 will now be described, with reference being had particularly to FIG. 10.

To operate the two speed drive 10 in high speed mode, the primary motor and primary electromagnetic coil of the clutch are energized. In this manner, the primary drive motor directly drives an external position movement apparatus with the primary clutch shaft spinning independently of the secondary clutch shaft, since the first and second sets of annular discs of the pre-assembled disc stack 54 are uncoupled. As indicated by numeral 176 in FIG. 10, in the high speed mode the secondary electromagnetic coil would not be energized, nor would the secondary drive motor.

To switch from high speed mode to low speed mode as a predetermined positional location is neared by the external position movement apparatus, the primary drive motor and the primary electromagnetic coil are de-energized, thereby resulting in the two sets of annular discs of the pre-assembled disc stack 54 to be coupled, and thereby engaging the primary clutch shaft with the secondary clutch shaft- As indicated by numeral 178 in FIG. 10, the secondary electromagnetic coil is energized (initially, this may be in a pulsed manner if needed to rapidly reduce speed to match that of the slow speed mode) and the secondary drive motor is energized. Thus, the brake is released by operation of the secondary electromagnetic coil, and the secondary drive motor drives through the worm and worm gear, through the clutch to the output shaft (the primary drive motor turning freely).

To engage the brake, the secondary drive motor and the secondary electromagnetic coil are de-energized, causing the two sets of annular discs of the second pre-assembled disc stack 140 to couple and thereby stop rotation of the worm shaft, and through the clutch, rotation of the output shaft.

During set-up or in the event of a power failure, the brake may be over-ridden by rotation of the socket head bolt so that the brake armature plate is axially moved so as to relieve spring bias force on the second pre-assembled disc stack 140. The crank may now be rotated so as to turn the worm shaft and, through the clutch, the output shaft.

Since the primary and secondary drive motors and the primary and secondary electromagnetic coils all operate from a source of electricity, in the event of a power failure, the clutch and the brake automatically engage, thereby preventing potential operator injury or apparatus damage.

It is preferred for the primary drive motor to be wired so as to be energized only when the primary electromagnetic coil is energized. This can be provided, for example by employing a parallel circuit controlled by a switch that simultaneously energizes both the primary drive motor and the primary electromagnetic coil. This feature ensures that the primary drive motor will operate without interference from any other component of the two-speed drive 10, as the clutch will be always disengaged when the primary drive motor is energized. The secondary drive motor is also preferred to be wired in parallel with respect to the secondary electromagnetic coil and be controlled by a single switch so that the secondary drive motor is simultaneously energized with the secondary electromagnetic coil (thus preventing the brake from actuating when the secondary drive motor is energized). Parallel wiring as described has the potential to save much material and labor cost in the installation of the two-speed drive 10, as electrical connections and wiring are minimized.

Figure 11:
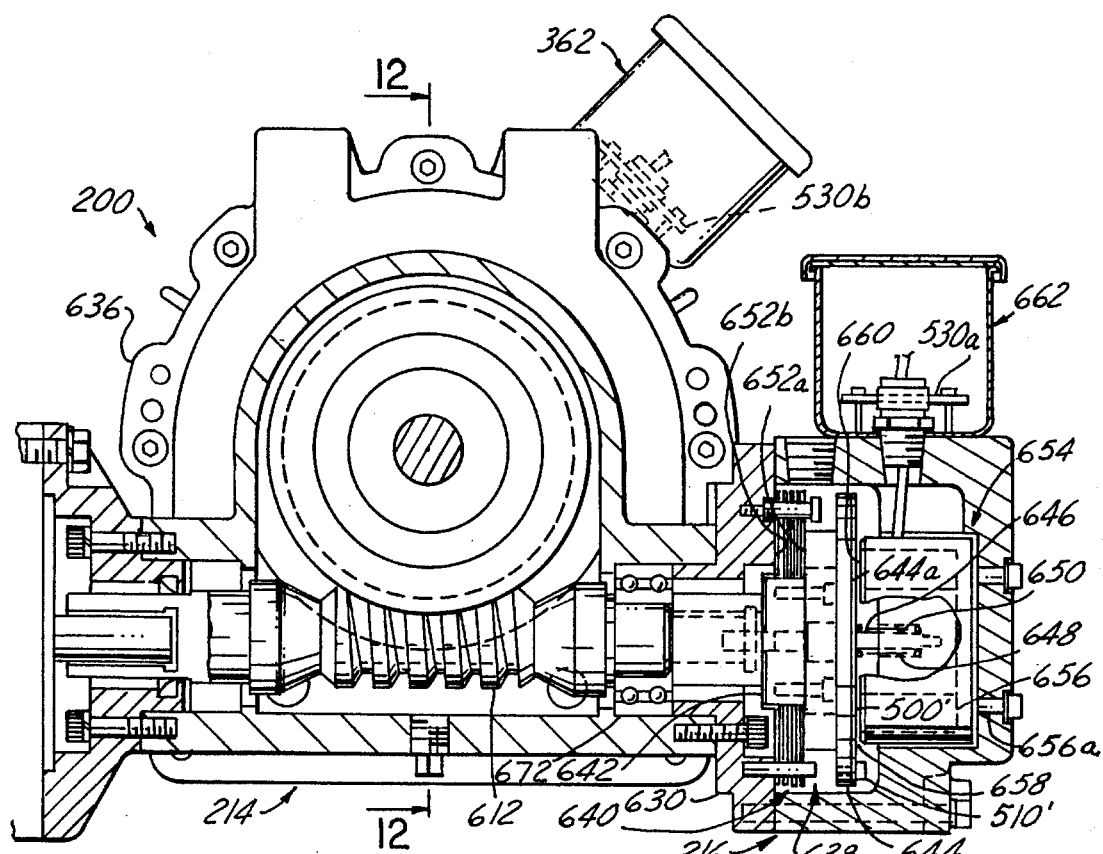
FIG. 11 is a partly sectional end view showing the brake portion of a second preferred two-speed drive and directing in particular the residual magnetism minimization members according to the present invention of the secondary drive assembly and the brake assembly.
Figure 12:
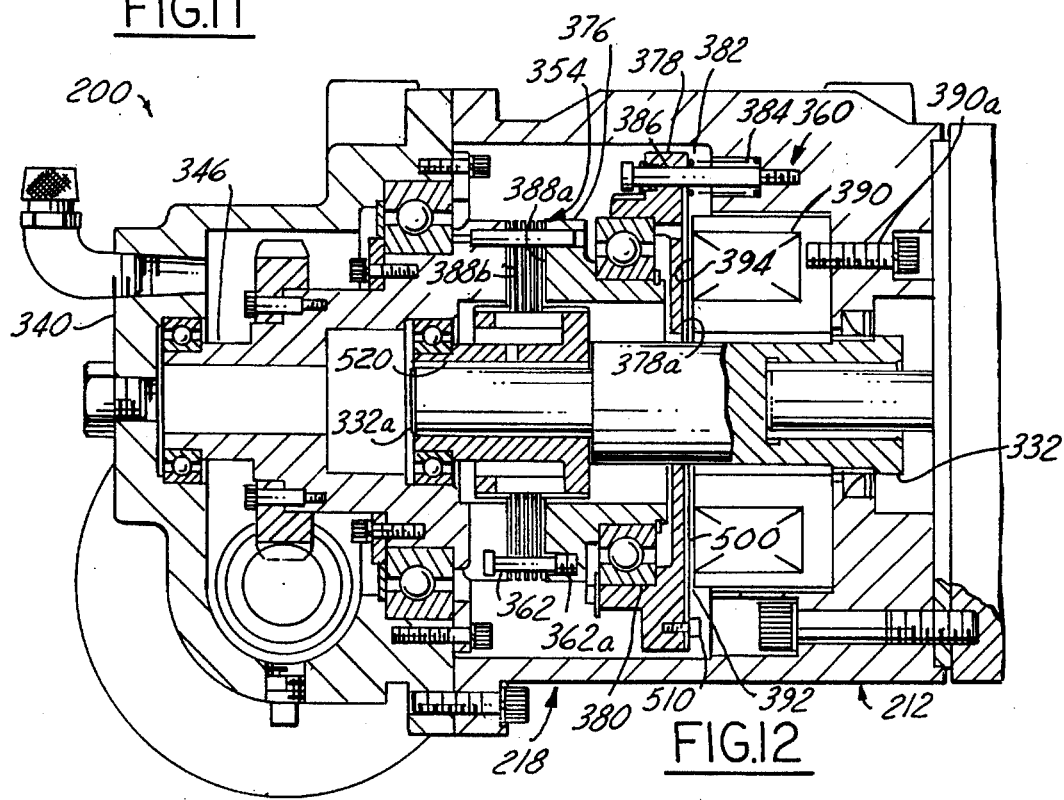
FIG. 12 is a partly sectional side view, depicting the clutch portion of the second preferred two-speed drive, seen along lines 12—12 in FIG. 11 and showing in particular the residual magnetism minimizing members according to the present invention of the primary drive assembly and the clutch assembly.
Figure 13:
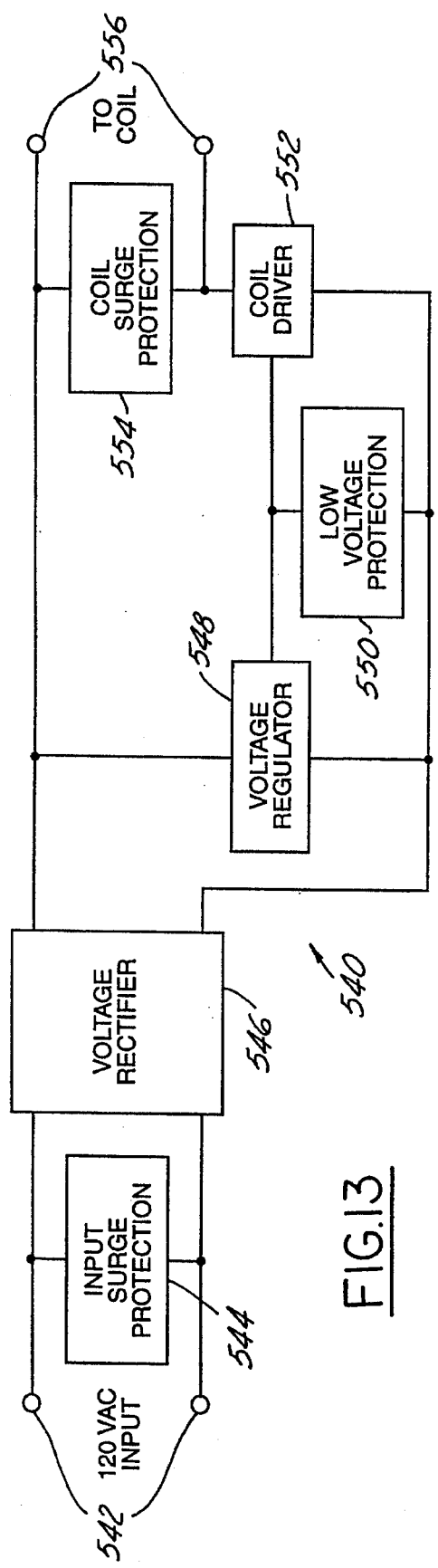
FIG. 13 is a function block schematic of a driver circuit according to the present invention for providing minimization of residual magnetism of the second preferred two-speed drive.

Now, with reference to FIGS. 11 through 13, the residual magnetism minimization feature according to the present invention will be detailed using by way of example a second preferred two-speed drive 200 that is so equipped.

The second preferred two-speed drive 200 has a primary drive assembly 212, a secondary drive assembly 214, a clutch assembly 218, and a brake assembly 216, each having a similar structure and function to that of the aforesaid first preferred two-speed drive 10; therefore as a consequence, no further elaboration of the components is necessary except where departure is made to accommodate the residual magnetism minimization feature according to the present invention.

Figure 15:
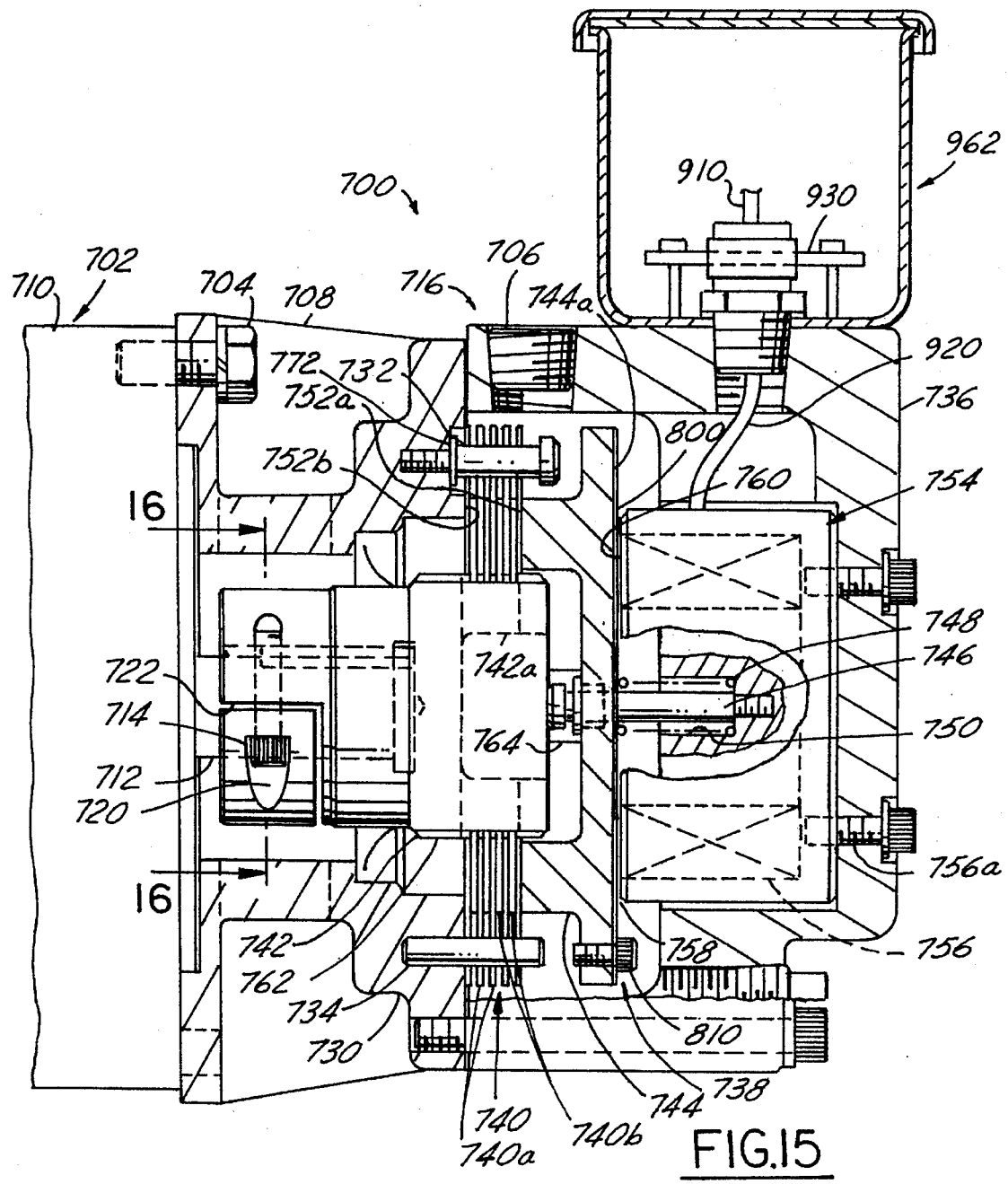
FIG. 15 is a partly sectional side view of an integral motor-brake having the residual magnetism minimization members according to the present invention.

Referring now to FIG. 12, as indicated with respect to the first preferred two-speed drive 10, annular discs composing the clutch disc stack 354 are selectively clamped together to thereby couple the primary clutch shaft 332 with respect to the secondary clutch shaft 346. In this regard, each of the double threaded nuts 362a of the alignment pins 362 threadably engage a clutch thrust plate 376. The clutch thrust plate 376, which rotates with the secondary clutch shaft 346, is connected to a non-rotating clutch armature plate 378 via a four-point contact bearing 380. A plurality of clutch springs 382 are seated within clutch spring cavities 384 located in the clutch housing 340. The clutch springs 382 bias against the clutch armature plate 378, causing the clutch thrust plate 376 to bias against the clutch disc stack 354. Axial movement of the clutch armature plate 378 in response to the biasing of the clutch springs 382, is regulated by shoulder bolts 386 which slidably engage the clutch armature plate and emanate anchorably from each of the clutch spring cavities 384. Clamping force between the two sets of annular discs of the clutch disc stack 354 is supplied by the biasing action of the clutch springs 382 evenly pressing a first thrust surface 388a on the clutch thrust plate 376 toward a second thrust surface 388b on the secondary clutch shaft 346. Preferably, the clutch disc stack 354 is a pre-assembled disc stack of the type referred to hereinabove with respect to the first preferred two-speed drive 10; however, while a double threaded nut threadably engaged on each alignment pin is acceptable, it is preferred for a threaded washer to be threadably engaged on each of the alignment pins, wherein the threads of the alignment pins directly thread into their respective threaded mounting holes or seats, as generally shown in FIG. 15.

Normally, the two sets of annular discs of the clutch disc stack 354 are clamped together by the biasing of the clutch springs 382. Accordingly, normally the secondary clutch shaft 346 is engaged with respect to the primary clutch shaft 332. In order that this engagement be user selectable, a clutch electromagnetic coil assembly 360 is provided. The clutch electromagnetic coil assembly 360 is composed of a primary electromagnetic coil 390 which is axially located within and connected by mounting bolts 390a to the clutch housing 340 so that the clutch housing serves as a heat sink for the primary electromagnetic coil A working air gap 392 is provided between the pole 394 of primary electromagnetic coil 390 and a coil face portion 378a of the clutch armature plate 378, which is constructed of a magnetic material. Upon energization of the primary electromagnetic coil 390, the clutch armature plate 378 is magnetically attracted thereto and moves axially toward the pole 394, the biasing force of the clutch springs being overcome. Since the four-point contact bearing 380 and the clutch thrust plate 376 move with the clutch armature plate 378, the clamping force being applied to the clutch disc stack 354 by the clutch springs 382 is relieved. Accordingly, the secondary clutch shaft 346 becomes disengaged from the primary clutch shaft 332. In this respect, the working air gap 394 and the necessary amount of inter-disc distance are predetermined with respect to the preset tolerance of the predetermined cross-section of the clutch disc stack 354 so that the two sets of annular discs of the clutch disc stack are rotatively independent when the primary electromagnetic coil 390 is energized.

In order that the release time of the clutch armature plate 378 with respect to the pole 394 is fast, a non-magnetic shim 500 is placed between the coil face portion 378a of the clutch armature plate and the pole. The preferred material of the non-magnetic shim 500 is a wafer of aluminum or stainless steel, but other non-magnetic materials may be used, including coatings. The non-magnetic shim 500 is connected with either or both the coil face portion 378a of the clutch armature plate 378 or the pole 394, and is typically for example about 0.015 inch thick. In the case of a coating type non-magnetic shim 500, the inherent adhesive nature thereof will automatically hold it affixed. In the case of a wafer type non-magnetic shim 500, bolts 510 may be used (shown by way of example in FIG. 12, wherein the non-magnetic shim is affixed to the coil face portion 378a) or an adhesive may be used to affix it. The non-magnetic shim 500 serves to reduce the magnetic flux through the clutch armature plate 378, thereby reducing residual magnetism when the electrical current to the primary electromagnetic coil 390 is shut-off. Accordingly, when the electrical current to the primary electromagnetic coil 390 is shut-off, the clutch springs 382 will thereupon quickly cause the clutch armature plate 378 to move away from the pole 394, thereby rapidly unclamping the two sets of annular discs of the clutch disc stack 354.

As a further aid to providing a fast response time, the magnetic circuit is minimized by replacing potentially magnetizable components with non-magnetic counterparts. Because the magnetic circuit now contains few magnetizable components, residual magnetism after the electrical current to the primary electromagnetic coil 390 is shut-off is minimized. In this regard, the primary clutch shaft 332 is constructed of a non-magnetic material, such as aluminum or stainless steel In the case of an aluminum primary clutch shaft 332, a reduced diameter end portion 332a is provided with outer splines which splinably interconnect with a splined hub 520 constructed of a more durable steel material for purposes of splinably connecting with the clutch disc stack 354 in the manner hereinabove recited with respect to the first preferred two-speed drive 10. Further in this regard, the clutch thrust plate 376 is constructed of a non-magnetic material, such as aluminum or stainless steel.

It will be noted in FIG. 11 that the brake assembly 216 of the two-speed drive 200 includes a brake 638 that is actuated by the annular discs composing a brake disc stack 640 being selectively clamped together to thereby couple the worm shaft 612 (which is supported on bearings 672 located outside the brake 638) via a brake hub 642 to the brake mounting plate 630. In this regard, a brake armature plate 644, is slidably supported and guided by a plurality of shoulder bolts 646, analogously as in the brake 138 of the first preferred two-speed drive 10, which emanate anchorably from brake spring cavities 650 in the brake housing 636. A brake spring 648 is seated within each of the brake spring cavities 650. The brake springs 648 bias against the brake armature plate 644, causing it to bias against the brake disc stack 640. Clamping force between the two sets of annular discs of the brake disc stack 640 is supplied by the biasing action of the brake springs 648 evenly pressing a first brake thrust surface 652a on the brake armature plate 644 toward a second brake thrust surface 652b on the brake mounting plate 630. Preferably, the brake disc stack 640 is a pre-assembled disc stack of the type referred to hereinabove with respect to the first preferred two-speed drive 10; however, while a double threaded nut threadably engaged on each alignment pin is acceptable, it is preferred for a threaded washer to be threadably engaged on each of the alignment pins, wherein the threads of the alignment pins directly thread into their respective threaded mounting holes or seats, as generally shown in FIG. 15.

Normally, the two sets of annular discs of the brake disc stack 640 are clamped together by the biasing of the brake springs 648. Accordingly, normally the worm shaft 612 is engaged with respect to the stationary housing components, via the brake mounting plate 630. In order that this engagement be user selectable, a brake electromagnetic coil assembly 654 is provided. The brake electromagnetic coil assembly 654 is composed of a secondary electromagnetic coil 656 which is axially located within and connected by mounting bolts 656a to the brake housing 636 so that the brake housing serves as a heat sink for the secondary electromagnetic coil. A working air gap 658 is provided between the pole 660 of the secondary electromagnetic coil 656 and a coil face portion 644a of the brake armature plate 644, which is constructed of a magnetic material. Upon energization of the secondary electromagnetic coil 656, the brake armature plate 644 is magnetically attracted thereto and moves axially toward the pole 660, the biasing force of the brake springs 648 being overcome so that the clamping force being applied to the brake disc stack 640 by the brake springs 648 is relieved. Accordingly, the worm shaft 612 becomes disengaged from the brake mounting plate 630. In this respect, the working air gap 658 and the necessary amount of inter-disc distance are predetermined with respect to the preset tolerance of the predetermined cross-section of the brake disc stack 640 so that the two sets of annular discs thereof are rotatively independent when the secondary electromagnetic coil 656 is energized.

In order that the release time of the brake armature plate 644 with respect to the pole 660 is fast, a non-magnetic shim 500' is placed between the coil face portion 644a of the brake armature plate and the pole. As per the non-magnetic shim 500 discussed hereinabove, the preferred material of the non-magnetic shim 500' is a wafer of aluminum or stainless steel, but other non-magnetic materials may be used, including coatings. The non-magnetic shim 500' is connected with either or both the brake armature plate 644 or the pole 660 and is typically for example about 0.015 inch thick. In the case of a coating type non-magnetic shim 500', the inherent adhesive nature thereof non-automatically hold it affixed. In the case of a wafer type non-magnetic shim 500', bolts 510' may be used (shown by way of example in FIG. 11 wherein, the non-magnetic shim is affixed to the coil face portion 644a) or an adhesive may be used to affix it. The non-magnetic shim 500' serves to reduce the magnetic flux through the brake armature plate 644, thereby reducing residual magnetism when the electrical current to the secondary electromagnetic coil 656 is shut-off. Accordingly, when the electrical current to the secondary electromagnetic coil 656 is shut-off, the brake springs 648 will quickly cause the brake armature plate 644 to move away from the pole 660.

As in the primary electromagnetic coil 390, oil is permitted to circulate about the secondary electromagnetic coil 656 to assist in heat dissipation.

Figure 14:
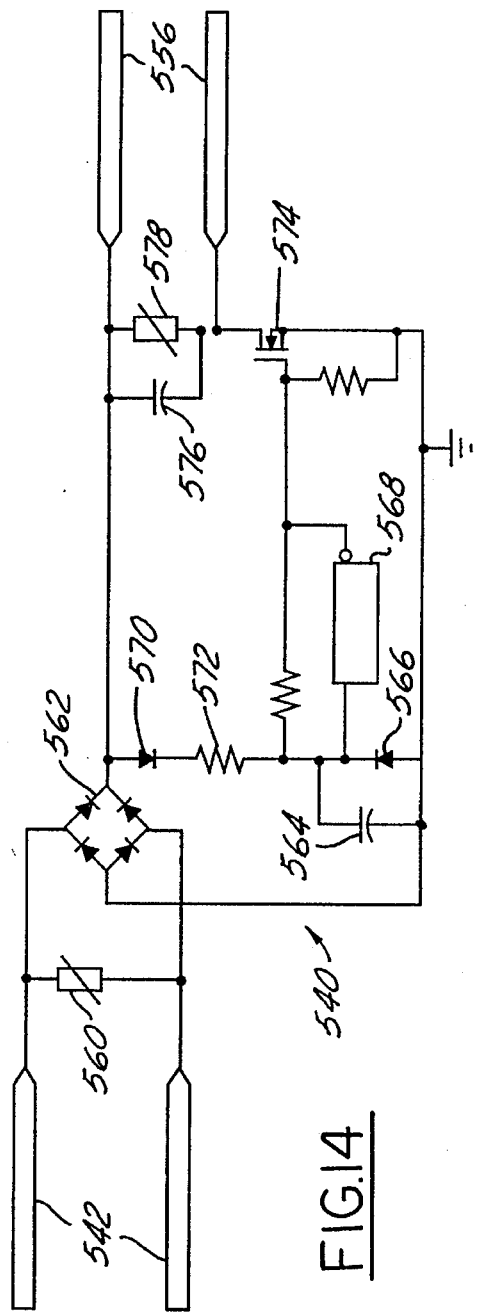
FIG. 14 is a circuit schematic of an exemplary driver circuit shown in FIG. 13.

An electric feed 362 is provided through the clutch housing 340 to provide connection of the primary electromagnetic coil 390 to a source of electricity, and an electric feed 662 is provided through the brake housing 636 to provide connection of the secondary electromagnetic coil 656 to a source of electricity. It will be noted from FIG. 11, that each of the electric feeds 362, 662 have a circuit board 530a, 530b connected respectively thereto. In this regard, a primary coil circuit board 530a provides a coil driver circuit for the primary electromagnetic coil 390, and a secondary coil circuit board 530b provides a coil driver circuit for the secondary electromagnetic coil 656. These coil driver circuits form a further part of the residual magnetization minimization feature according to the present invention, wherein the response time is fast because of managed control of the induced EMF as the respective primary and secondary coils are de-energized. Referring now to FIGS. 13 and 14, a exemplary preferred coil driver circuit 540 will be detailed.

An input 542 from an external source of electricity is provided with a parallel connected surge protector 544, such as for example a varistor, which serves to protect the coil driver circuit from transients generated from other inductive loads on the same machine to which the present invention is connected.

Next, a voltage rectifier 546 changes the AC (alternating current) electrical input to DC (direct current) for driving the respective primary or secondary electromagnetic coil.

Thereafter, a voltage regulator 548 regulates the voltage required to operate the respective primary or secondary electromagentic coil and other circuit components.

Next, a low voltage detector 550 ensures that the coil driver (see below) is in the saturated mode, or OFF. This prevents the coil driver from being partially turned ON and driven in the linear mode. In this regard, if the coil driver is operated in the linear mode, its power limit would be exceeded.

Thereafter, a coil driver 552 of the field effect transistor (FET) type, serves to disconnect the respective primary or secondary electromagnetic coil from the rectifier 546 when electricity to the respective primary or secondary electromagnetic coil is switched off. Thus, the diodes of the rectifier 546 cannot serve as a path for electrical current of the respective primary or secondary electromagnetic coil to maintain residual magnetism thereof. Preferably in this regard, a solid state driver is used instead of a relay to prevent arcing while the respective primary or secondary electromagnetic coil de-energizes.

Lastly, an output coil surge protector 554 is located in parallel with the coil output 556 to protect the coil driver circuit from transients generated from the respective primary or secondary electromagnetic coil, and further keeps the peak voltage low, ensuring rapid de-enerization of the respective primary or secondary electromagnetic coil. The preferred output coil surge protector 554 is a varistor, since there is then no heating and the coil driver 552 and the voltage rectifier 546 are protected from additional peak loads.

Figure 16:
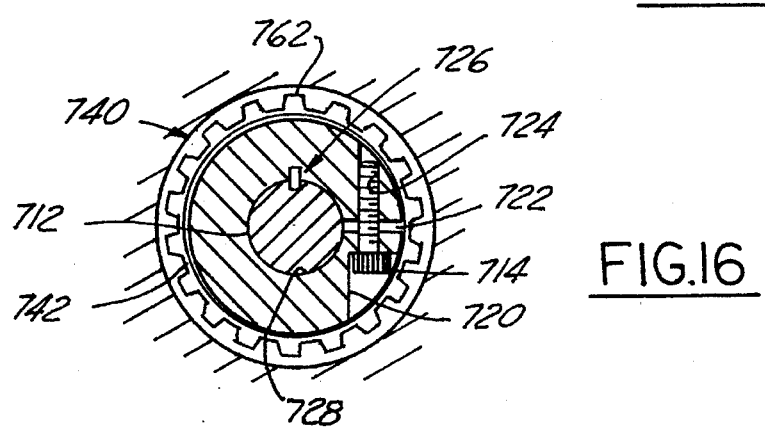
FIG. 16 is a partly sectional end view along line 16—16, showing the connection of the motor shaft with the brake assembly of the integral motor-brake of FIG. 15.

An example of a coil driver circuit 540 is depicted in FIG. 14. Varistor 560 protects the 120 VAC input Rectifier 562 rectifies AC to DC. One microfarad capacitor 564 stabilizes the input voltage. Zener diode 566 regulates voltage. Chip 550 is a low voltage detector. Diode 570 provides reverse voltage protection. Ten thousand Ohm resistor 572 provides a voltage drop to 6.2 volts. FET 574 serves as a driver. Ten picofarad capacitor 576 supresses voltage spikes. Finally, varistor 578 supresses voltage surges at the output 556 to the respective primary or secondary electromagnetic coil Referring now to FIGS. 15 and 16, an integral motor-brake will be detailed which utilizes the residual magnetism minimization feature according to the present invention.

The integral motor-brake 700 includes a conventional electric motor 702 having a two-ended motor shaft 712 (one end not shown) connected rotatably thereto for transmitting rotation at opposite sides of the motor, and further includes a brake assembly 716 having a brake housing 736 which is connected with the motor housing 710 of the motor 702 via a housing adapter 708 and housing bolts 704. As shown in FIG. 15 and particularly FIG. 16, one end of the motor shaft 712 is connected with a brake hub 742 having external splines 762 and an internal axial bore 728. The motor shaft 712 is received into the axial bore 728, and a mutual key and keyway 726 transmits rotation from the motor shaft to the brake hub. The brake hub 742 preferably has slots 722, a cut-out, and a threaded bore 724 into which a hub bolt 714 threads, the tightening of which thereby holds the brake hub axially fixed with respect to the motor shaft.

It will be noted in FIG. 15 that the brake assembly 716 of the integral motor-brake 700 includes a brake 738 that is actuated by the annular discs composing a brake disc stack 740 being selectively clamped together to thereby couple the motor shaft 712 to a brake mounting plate 730, wherein one set of annular discs 740a is connected via the splines 762 with the brake hub 742 which is, as mentioned, connected with the motor shaft 712 and the other set of annular discs 740b is connected with the brake housing 736 via alignment pins 732 and dowels 734. In this regard, a brake armature plate 744, is slidably supported and guided by a plurality of shoulder bolts 746 (two being preferred), analogously as in the brake assembly 216 shown in FIG. 11, which emanates anchorably from respective brake spring cavities 750 formed in the brake housing 736. A brake spring 748 is seated within each of the brake spring cavities cavity 750. The brake springs 748 bias against the brake armature plate 744, causing it to bias against the brake disc stack 740. Clamping force between the two sets of annular discs of the brake disc stack 740 is supplied by the biasing action of the brake springs 748 evenly pressing a first brake thrust surface 752a on the brake armature plate 744 toward a second brake thrust surf ace 752b on the brake mounting plate 730. Preferably, the brake disc stack 740 is a pre-assembled disc stack of the type referred to hereinabove with respect to the first preferred two-speed drive 10. In this regard, while a double threaded nut could be used (as discussed hereinabove), it is preferred to use a threaded washer 772 which is threadably engaged on the threads of each of the alignment pins 732, so that the disc stack 740 is trapped between the head of the alignment pins 732 and the threaded washer, a portion of the threaded second end of the alignment pins being threadably engaged with a threaded hole in the brake mounting plate 730.

Normally, the two sets of annular discs of the brake disc stack 740 are clamped together by the biasing of the brake springs 748. Accordingly, normally the motor shaft 712 is engaged with respect to the stationary housing components, via the brake mounting plate 730. In order that this engagement be user selectable, a brake electromagnetic coil assembly 754 is provided. The brake electromagnetic coil assembly 754 is composed of an electromagnetic coil 756 which is axially located within and connected by mounting bolts 756a to the brake housing 736 so that the brake housing serves as a heat sink for the electromagnetic coil. A working air gap 758 is provided between the pole 760 of the electromagnetic coil 756 and a coil face portion 744a of the brake armature plate 744, which is constructed of a magnetic material. Upon energization of the electromagnetic coil 756, the brake armature plate 744 is magnetically attracted thereto and moves axially toward the pole 760, the biasing force of the brake springs 748 being overcome so that the clamping force being applied to the brake disc stack 740 by the brake springs 748 is relieved. Accordingly, the motor shaft 712 becomes disengaged from the brake mounting plate 730. In this respect, the working air gap 758 and the necessary amount of inter-disc distance are predetermined with respect to the preset tolerance of the predetermined cross-section of the brake disc stack 740 so that the two sets of annular discs thereof are rotatively independent when the electromagnetic coil 756 is energized.

In order that the release time of the brake armature plate 744 with respect to the pole 760 is fast, a non-magnetic shim 800 is placed between the coil face portion 744a of the brake armature plate and the pole. As per the non-magnetic shims 500, 500' discussed hereinabove, the preferred material of the non-magnetic shim 800 is a wafer of aluminum or stainless steel (stainless steel being preferred), but other non-magnetic materials may be used, including coatings. The non-magnetic shim 800 is connected with either or both the brake armature plate 744 or the pole 760 and is typically for example about 0.015 inch thick. In the case of a coating type non-magnetic shim 800, the inherent adhesive nature thereof will automatically hold it affixed. In the case of a wafer type non-magnetic shim 800, bolts 810 may be used (shown by way of example in FIG. 15 wherein, the non-magnetic shim is affixed to the coil face portion 744a) or an adhesive may be used to affix it. The non-magnetic shim 800 serves to reduce the magnetic flux through the brake armature plate 744, thereby reducing residual magnetism when the electrical current to the electromagnetic coil 756 is shut-off. Accordingly, when the electrical current to the electromagnetic coil 756 is shut-off, the brake springs 748 oil quickly cause the brake armature plate 744 to move away from the pole 760.

Oil (introduced by a filler cap 706) is permitted to circulate about the electromagnetic coil 756, including via passageway 764 and brake housing recess 742a, to assist in heat dissipation.

An electric feed 962 is provided through the brake housing 736 to provide connection of the electromagnetic coil 756 to a source of electricity via in-lead 910. It will be noted from FIG. 15, that the electric feed 962 has a circuit board 930 mechanically connected thereto, and electrically connected to the in-lead 910 and connected to the electromagnetic coil 756 via a down-lead 920. In this regard, a coil circuit board 930 provides a coil driver circuit for the electromagnetic coil 756. The coil driver circuit forms a further part of the residual magnetization minimization feature according to the present invention, wherein the response time is fast because of managed control of the induced EMF as the electromagnetic coil is de-energized. The coil driver circuit is the same as that already described with respect to coil driver circuits depicted in FIGS. 13 and 14, which, for the sake of brevity, need not be repeated again here.

It is to be understood that the hereinabove described preferred embodiment of the residual magnetism minimization feature according to the present invention is by way only of exemplification with respect to a two-speed drive and an integral motor-brake. Other electrically actuated disc stack embodiments may be provided with the present invention. For example, U.S. Pat. No. 5,172,798 to Mabee dated Dec. 22, 1992 and U.S. Pat. No. 5,389,049 to Mabee dated Feb. 14, 1995, which are both assigned to the same assignee as the present application, and which are both hereby incorporated by reference, disclose a number of examples of electrical actuation systems for providing selective clamping of disc stacks of clutches, brakes and combinations thereof. The residual magnetism minimization feature according to the present invention may be implemented by placing a non-magnetic shim between the armature plate and the electromagnetic coil of any of the embodiments described in U.S. Pat. Nos. 5,172,798 and 5,389,049 in the manner generally described hereinabove. Further, the shaft of any of the embodiments described in U.S. Pat. No. 5,172,798 which passes concentric with respect to the electromagnetic coil may be composed of a non-magnetic material in the manner generally described hereinabove, wherein provision for interconnection with the disc stack may employ connection to the shaft of a durable steel hub analogous to hub 520 described hereinabove. Further, the thrust plate may be constructed of a non-magnetic material of any of the embodiments of U.S. Pat. No. 5,172,798 in the manner generally described hereinabove. Finally, the circuit for actuating the electromagnetic coil of any of the embodiments described in U.S. Pat. No. 5,172,798 my incorporate the driver circuit as generally described hereinabove.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An integral motor-brake, said device comprising:
    an electric motor having a motor housing, said electric motor further having a motor shaft;
    a brake assembly connected with said electric motor, said brake assembly comprising:
        a brake housing connected to said motor housing; and
        a brake located within said brake housing, said brake comprising:
            a brake hub having external splines;
            means for connecting said brake hub to said motor shaft;
            a disc stack comprising:
                a first set of annular discs; and
                a second set of annular discs, said second set of annular discs being interleaved with said first set of annular discs in a prearranged order;
            first connection means for connecting said first set of annular discs with said splines, wherein said first set of annular discs is nonrotatable with respect to said brake hub, wherein further said first set of annular discs is slidable with respect to said brake hub in an axial direction parallel with said motor shaft;
            second connection means for connecting said second set of annular discs with said brake housing, wherein said second set of annular discs is nonrotatable with respect to said brake housing, wherein further said second set of annular discs is slidable with respect to said brake housing in said axial direction; and
            biasing means connected with said housing for selectively biasing said first set of annular discs with respect to said second set of annular discs to thereby regulate relative rotation between said motor shaft and said brake housing, wherein said biasing means comprises an electromagnetically actuated biasing means comprising:
                a brake armature plate having a coil face portion constructed of a magnetic material, said brake armature plate being slidably connected with said brake housing for slidable movement in said axial direction;
                a first thrust surface connected with said armature plate for abutably contacting a first side of said disc stack;
                a second thrust surface connected with said brake housing for abutably contacting a second side of said disc stack opposite with respect to said first side thereof;
                spring biasing mean s connected with said brake housing for biasing said brake armature plate to thereby selectively bias said first thrust surface with respect to said disc stack to thereby selectively clamp said first and second annular discs together between said first and second thrust surfaces;
                electromagnetic coil means comprising an electromagnetic coil, said electromagnetic coil means being connected with said brake housing for magnetically attracting said coil face portion of said brake armature plate in response to energization of said electromagnetic coil; and
                substantially non-magnetic shim means located between said coil face portion and said electromagnetic coil means for reducing magnetic flux of said electromagnetic coil with respect to said brake armature plate;
        wherein said spring biasing means biases said brake armature plate against said disc stack thereby causing said first and second thrust surfaces to bias against said disc stack so as to clamp said first set of annular discs with respect to said second set of annular discs; wherein further, energization of said secondary electromagnetic coil magnetically attracts said brake armature plate so as to relieve said biasing of said brake armature plate against said disc stack; and wherein upon de-energization of said secondary electromagnetic coil, said spring biasing means rapidly thereafter biases said brake armature plate against said disc stack.

2. The integral motor-brake of claim 1, further comprising a brake mounting plate fixedly connected to said brake housing, said brake mounting plate having said second thrust surface.

3. The integral motor-brake of claim 2, further comprising coal driver circuit means for providing rapid de-energization of said electromagnetic coil.

4. The integral motor-brake of claim 3, wherein said coil driver circuit means comprises:
    rectifier means for converting an alternating current input thereto to a direct current output therefrom for driving said electromagnetic coil;
    solid state coil driver means for providing disconnection of said electromagnetic coil from said rectifier when electrical current to said electromagnetic coil is switched off;
    low voltage detector means for providing a saturated operation state of said solid state coil driver means; and output coil surge protector means for protecting said coil driver circuit mean s from transients generated by said electromagnetic coil.

5. The integral motor-brake of claim 1, further comprising driver circuit means for providing rapid de-energization of said electromagnetic coil.

6. The integral motor-brake of claim 1, wherein each annular disc of said first set of annular discs has a first inner substantially circular periphery and a first outer substantially circular periphery, wherein further each annular disc of said second set of annular discs has a second inner substantially circular periphery and a second outer substantially circular periphery, said first inner periphery defining a first diameter, said second inner periphery defining a second diameter, said first diameter being less than said second diameter, said first outer periphery defining a third diameter, said second outer periphery defining a fourth diameter, said third diameter being less than said fourth diameter;

a plurality of alignment pins, each alignment pin of said plurality of alignment pins having a first end and an opposite second end; and abutment means located at said first end and said second end of each said alignment pin for providing an abutment at each of said first and second end thereof;

wherein each annular disc of said second set of annular discs is provided with a plurality of circumferentially disposed alignment holes, an alignment pin of said plurality of alignment pins extending through each alignment hole of said plurality of alignment holes, said first and second sets of annular discs being captured on said plurality of alignment pins by said abutment means.

7. The integral motor-brake of claim 6, wherein each said second end of said alignment pins is threaded; wherein said abutment means at said second end of each said alignment pin comprises a threaded washer threadably engaged with respect to said threads of said second end.

8. The integral motor-brake of claim 7, further comprising a brake mounting plate fixedly connected to said brake housing, said brake mounting plate having said second thrust surface, said mounting plate being provided with threaded holes; wherein said second end of said alignment pins are each, respectively, threadably engaged with said threaded holes of said brake mounting plate.

9. The integral motor-brake of claim 8, further comprising driver circuit means for providing rapid de-energization of said electromagnetic coil.

10. A pre-assembled disc stack for use in drives, brakes and combinations thereof, comprising:

a disc stack comprising:
 a first set of annular discs; and
 a second set of annular discs, said second set of annular discs being interleaved with said first set of annular discs in a prearranged order;
 wherein each annular disc of said first set of annular discs has a first inner substantially circular periphery and a first outer substantially circular periphery, wherein further each annular disc of said second set of annular discs has a second inner substantially circular periphery and a second outer substantially circular periphery, said first inner periphery defining a first diameter, said second inner periphery defining a second diameter, said first diameter being less than said second diameter, said first outer periphery defining a third diameter, said second outer periphery defining a fourth diameter, said third diameter being less than said fourth diameter; and a plurality of alignment pins, each alignment pin of said plurality of alignment pins having a first end and an opposite second end, abutment means being located at said first end and said second end of each said alignment pin for providing an abutment at each of said first and second end thereof, said second end of said alignment pins being threaded along a predetermined length thereof, said abutment means comprising:
 a head located at said first end of each said alignment pin; and
 a threaded washer threadably engaged with respect to said threads of said second end of each said alignment pin, wherein said threaded washer occupies a length less than said predetermined length for providing threading connection of said threaded second end to a preselected component of at least one of a drive, a brake and a combination thereof;

wherein each annular disc of said second set of annular discs is provided with a plurality of circumferentially disposed alignment holes, an alignment pin of said plurality of alignment pins extending through each alignment hole of said plurality of alignment holes, said first and second sets of annular discs being captured on said plurality of alignment pins by said abutment means.

* * * * *